United States Patent Office 2,838,059
Patented June 10, 1958

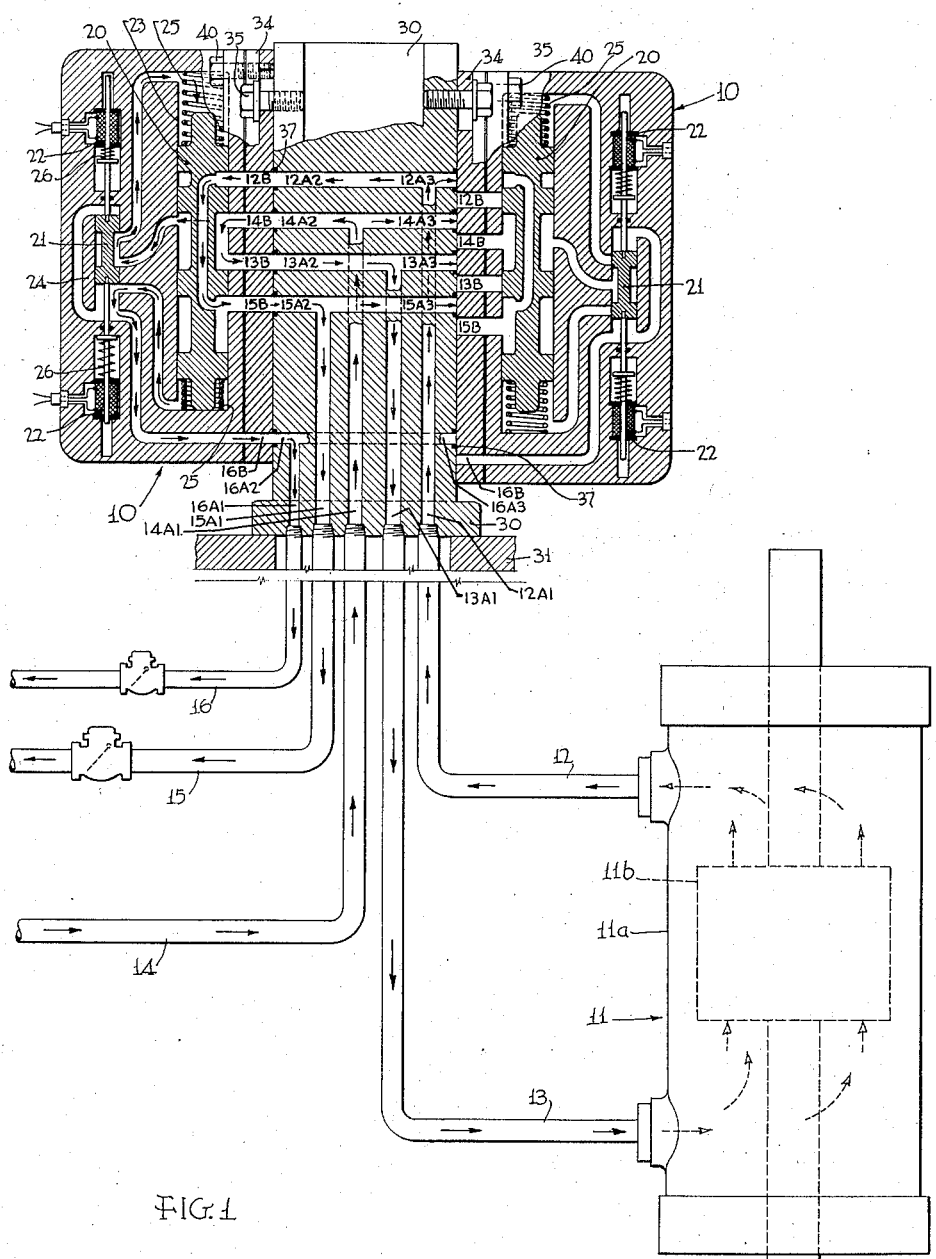

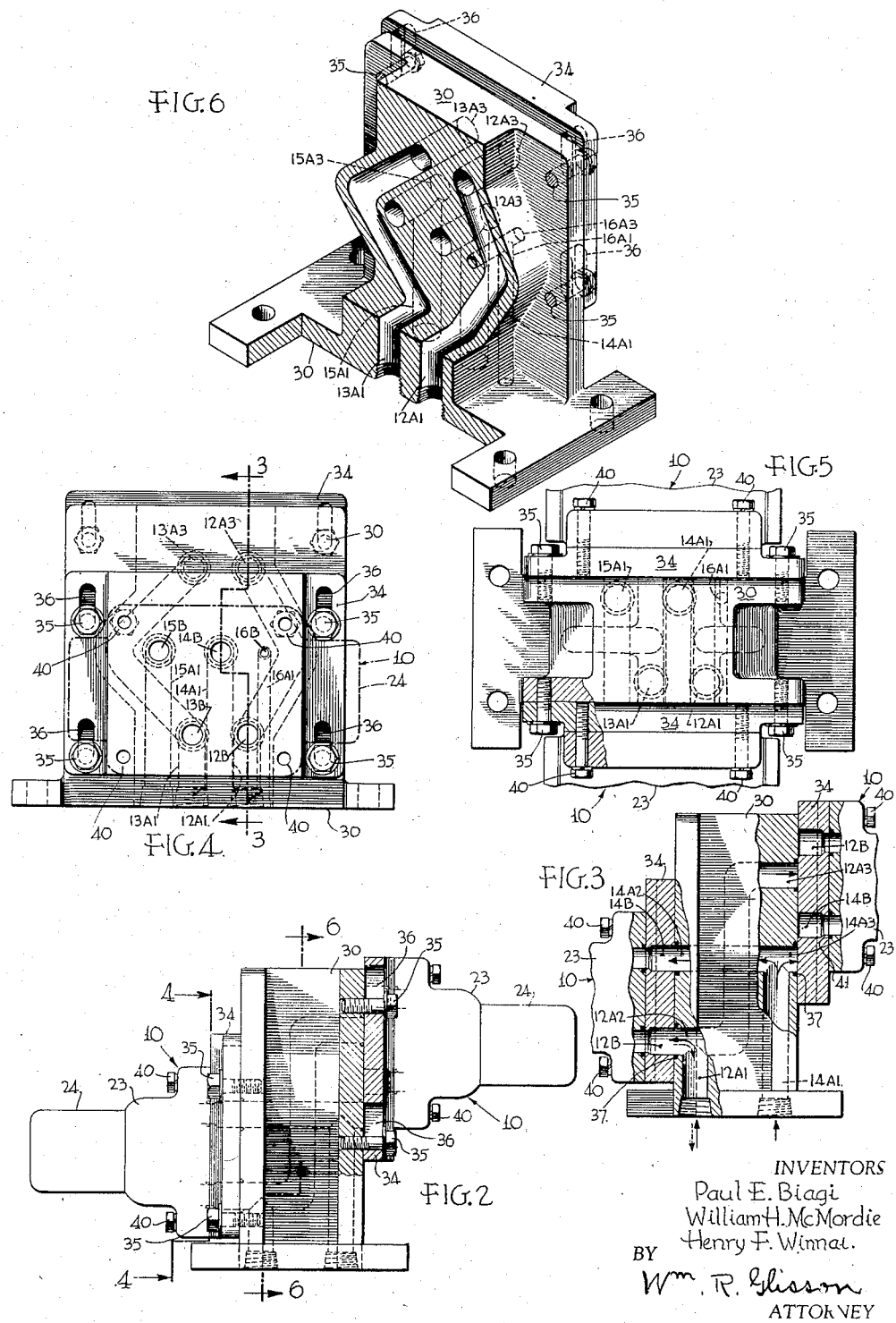

2,838,059

APPARATUS AND METHOD FOR MOUNTING AND REPLACING HYDRAULIC VALVE UNITS

Paul E. Biagi, Upper Darby, William H. McMordie, Philadelphia, and Henry F. Winnai, Willow Grove, Pa., assignors to The Budd Company, Philadelphia, Pa., a corporation of Pennsylvania Application May 10, 1955, Serial No. 507,252

8 Claims. (Cl. 137—15)

This invention relates to apparatus and method for mounting and replacing hydraulic valve units and has for an object the provision of improvements in this art.

In many installations it is the practice to employ remotely operated control valves for fluid actuated power devices, an electrically operated solenoid being frequently used for operating the valve or for operating a pilot valve which causes the operation of the main valve. A unit which is now widely used comprises a valve and solenoid operated pilot valve having ports which match the ports of a mounting subplate which has connections to the power source, the power device, and the return reservoir.

The solenoid valve units often become inoperative and need replacement. Their repair may take considerable time, which causes the operating unit to be shut down, entailing considerable production loss. Even when a spare unit is available there may be considerable loss of time in obtaining a new unit from stock and in making the exchange of units. The installation requires the installation of a number of cut-off valves near the operating valve unit involving considerable expense and local obstruction in the operating valve region. Also, in the exchange a considerable amount of liquid is lost with corresponding creation of machine and floor soilage which must be cleaned up.

According to the present invention an improved mounting for a unit is provided such that the unit can be very quickly cut off from the fluid lines so that there is little or no spillage in making an exchange.

In the preferred arrangement, a mounting is provided which carries both an operating unit and a spare unit, one being in operation and the other in position for operation when the energizing source is shifted. The disabled unit may be exchanged for an operative unit at the next shut-down period without loss of working time. The units can be quickly shifted into or out of operating position for making the exchange, and when a unit is off, its base ports are sealed by a shiftable cover plate.

The objects and various novel features of the invention will be apparent from the following description of an exemplary embodiment, reference being made to the accompanying drawings, wherein:

Fig. 1 is a diagrammatic view to illustrate the principles of the invention;

Fig. 2 is an end elevation of actual apparatus embodying the invention;

Fig. 3 is a view similar to Fig. 2 but having parts cut away, as on the line 3—3 of Fig. 4, to show porting arrangements;

Fig. 4 is a left side elevation of parts shown in Fig. 2 with the valve unit removed and shown only in outline, the view being taken on the line 4—4 of Fig. 2;

Fig. 5 is a top plan view of the parts shown in Fig. 2; and

Fig. 6 is a vertical section in perspective taken on the line 6—6 of Fig. 2.

As shown in the drawings, a valve unit 10 is provided for controlling the flow of fluid to and from a power unit 11. In hydraulic systems oil is the fluid employed, and in the illustrated form the power unit comprises a cylinder-piston unit including a cylinder 11a and a piston 11b. Fluid is introduced and removed from each end of the cylinder 11 by pipe lines 12, 13 extending to the valve unit.

Fluid under pressure is supplied to the valve unit by a pipe line 14 and fluid from the valve unit is returned by a pipe line 15. There may be a separate drain line 16 from the valve unit.

The valve unit comprises a main valve 20 operated both ways by fluid and a pilot valve 21 operated both ways by solenoids 22. Suitable channeled and ported casings 23 and 24 are provided for the main and pilot valves respectively; and centering springs 25 and 26 are provided for the valves.

Control by a single valve unit of this type is well known. When only a single unit is used and permanently connected, it is difficult to remove and replace and the operation entails much loss of working time and expensive shutdown of large machines.

According to the present invention, an improved base and valve mounting are provided to permit a valve unit to be quickly shifted to seal it off from the base so it may be quickly replaced by a new valve unit.

In a more specific form, the invention provides a duplex assembly in which two valve units are mounted on a common base, one of the valve units being connected for active control and the other or spare unit being mounted in an inactive position or, preferably, being mounted in working position but not being cycled for operation. When an active unit becomes disabled, it is cut out of circuit and the other unit is cut in. At any later idle period when the pressure fluid can be cut off for a short time, the disabled unit is shifted to inactive position and removed and repaired and replaced or is at once replaced by an operative unit. In either case, the replaced unit is left in position as a spare until it is needed. Then a shift is again made when another replacement is needed.

In the specific form illustrated, a main base 30 is provided and this base is secured to the panel 31 and the fluid lines 12, 13, 14, 15 and 16 connected to it. The main base is provided with through passages or channels which correspond to the several fluid lines 12, 13, 14, 15 and 16 and which on one side are formed as ported channels 12A1, 13A1, 14A1, 15A1 and 16A1 which match the pipe openings on the panel 31.

On another side the passages or channels extend as ported passages 12A2, 13A2, 14A2, 15A2 and 16A2; and on a third side the channels extend as ported passages 12A3, 13A3, 14A3, 15A3 and 16A3. The relative location and size of the port openings on the second and third faces are identical, and in the diagrammatic form illustrated in Fig. 1 the second and third faces are disposed directly opposite each other. In the actual form shown in Figs. 2 to 6, some of the openings are vertically offset to provide reverse side port coincidence, with valve unit inversion.

At each of the second and third faces there is mounted an adapter plate 34 having through channels or passages corresponding in size and location to the ports on the second and third sides of the base 30. The means for securing the plates to the base faces are such and the facing areas are such that the plates may be secured to the base with the ports all in registry or with all of the ports out of registry so that the plate covers and seals off all of the ports of the base on that side. The specific fastening means comprises cap bolts 35 threaded into the base and passing through elongated holes or slots 36 in the plate. As an aid in preventing leakage when the parts are secured together and while being shifted, the ports of one of the facing parts, here the base, are counterbored and provided with sealing rings 37. Resilient elements known as O-rings are shown. These extend above the base surface against the plate until they are compressed by clamping the parts together.

On the outer side the ports of a plate match in size and location the ports of a valve unit 10. The passages of a plate, as shown, extend straight through and are designated as 12B, 13B, 14B, 15B and 16B. Means, such as cap bolts 40, are provided for securing a valve unit 10 to a plate 34. The ports of the valve unit register with those of the adapter plate 34 whenever the parts are assembled, and, if desired, sealing O-rings 41 may be provided or a ported shim sheet or gasket may be disposed between the faces.

In use, when a valve unit 10 on one side gets out of order, the other can be cut in at once by shifting the solenoid control connections. Then to remove the disabled unit the bolts 35 are loosened and the plate 34 with the valve unit is moved to inoperative position, sealing off the ports of the base; then the bolts 35 are retightened. Preferably the pressure line is cut off for the change. The disabled valve unit is removed by taking out the bolts 40 and a good spare unit put in its place and the plate 34 shifted back and clamped in position ready for use of the unit whenever needed.

It is thus seen that the invention provides improved apparatus and method for mounting and replacing valve units, the apparatus being simple and inexpensive and the method providing quick and easy removal and replacement of a valve unit with a minimum of shutdown time.

While one embodiment of the invention has been illustrated and described by way of example, it is to be understood that there may be various embodiments and modifications within the general scope of the invention.

What is claimed is:

1. Apparatus for mounting a valve unit having a plurality of connection ports, comprising in combination, a ported valve unit, a ported base having pipe connections on one side and connection ports on another side corresponding in location to the ports in said valve unit, a mounting plate having through passages with ports corresponding in location to the ports in said valve unit and said base, means for securing said valve unit to said mounting plate with the respective ports in registry, and means for securing said mounting plate to the ported side of the base with the respective ports in registry, said last-mentioned securing means providing relative movement when loosened to permit the ports of the base and mounting plate to be moved out of registry with each other whereby the base ports are closed off when the mounting plate is secured in the non-registering position of ports.

2. Apparatus for mounting a valve unit having a plurality of connection ports, comprising in combination, a ported valve unit, a ported base having fluid connections on one side and connection ports on the other side corresponding to the ports on said valve unit, a mounting plate having through passages with ports on one side corresponding to and registering with the ports of said valve unit and having ports on another side corresponding to and registering with the ports of said base, means for securing said mounting plate to said base with the ports in registry or out of registry, the securing means providing movement between the registry and non-registry positions by loosening without separation, and means for securing the valve unit to the mounting plate with the ports in registry.

3. Apparatus as set forth in claim 2, wherein sealing rings are provided at the ports between the base and mounting plate.

4. Apparatus as set forth in claim 2, wherein the means for securing the mounting plate to the base comprises a slot and bolt connection, the plate having an area facing the base of sufficient extent to cover the ports of the base in either position of the plate.

5. Apparatus for mounting a valve unit having a plurality of connection ports, comprising in combination, a ported base having fluid connections on one side and a plurality of attaching sides having each a plurality of connection ports of the same locational arrangement, the base having through passages between the connections and the ports of all connection sides, a mounting plate having through passages and ports on one side corresponding to the ports of said base adjustably mounted on each of said connection sides of the base, the adjustment of a plate providing movement by loosening parts and without removal of the plate such that the plate may be secured to the base with the ports in registry or out of registry with the ports of the base sealed off, each plate also having outer ports for its passages with the ports of all plates having the same arrangement, valve units having ports corresponding to ports on the outer side of a plate, and means for securing a valve unit to each plate with the respective ports in registry.

6. Apparatus as set forth in claim 5, wherein sealing rings are provided between the plates and base at each port, the rings being of resilient material and being compressed between a plate and the base when the plate is clamped tight against the base.

7. The method of exchanging ported valve units on a ported base having permanent pipe connections on one side for a plurality of passages and a plurality of channelled and ported plates on other sides which are movable between port registering and non-registering positions on the base, which comprises, connecting a first valve unit with one plate and moving it into port-registering position on the base so that the said first valve unit is operative, moving another plate carrying a second valve unit to non-registering position and clamping it, and then removing the said second valve unit from the plate.

8. The method of exchanging ported valve units on a ported base having permanent pipe connections on one side for a plurality of passages and a channelled and ported plate on another side which is movable between port registering position and a non-registering position on the base where it seals off the base ports, which comprises, moving the plate carrying an old valve unit from a registering to a sealing position and clamping it, exchanging the old valve unit for a new valve unit, and moving the plate with the new valve unit back into registering position on the base and reclamping it.

No references cited.